United States Patent [19]

Siegel et al.

[11] 4,224,744
[45] Sep. 30, 1980

[54] CIRCUITRY FOR TEACHING SOLDERING AND PRACTICE CIRCUIT BOARD FOR USE THEREWITH

[75] Inventors: William J. Siegel, Silver Spring; Gerald J. Ferguson, Jr., Upper Marlboro, both of Md.

[73] Assignee: Pace Incorporated, Silver Spring, Md.

[21] Appl. No.: 905,336

[22] Filed: May 12, 1978

[51] Int. Cl.³ .................... G09B 25/02; B23K 1/00; H05K 3/34
[52] U.S. Cl. .................................. 35/13; 29/829; 219/85 M; 228/103; 174/68.5
[58] Field of Search ............ 35/13, 19 A; 228/56.5, 228/103; 73/15 R, 15 A, 15 B, 1 F, 359 R, 359 A, DIG. 4, DIG. 7, DIG. 9; 156/901; 219/85 F, 85 M, 109, 110; 29/625, 626; 174/68.5

[56] References Cited

U.S. PATENT DOCUMENTS

| 3,211,001 | 10/1965 | Pettit ........................................ 73/359 |
| 3,562,927 | 2/1971 | Moskowitz ............................ 35/22 R |
| 3,675,343 | 7/1972 | Swiatosz et al. ...................... 35/10 |
| 3,778,581 | 12/1973 | Denny ................................ 219/85 F |
| 4,013,208 | 3/1977 | Mason et al. .................. 219/85 F X |
| 4,041,615 | 8/1977 | Whitehill .............................. 35/13 |

OTHER PUBLICATIONS

"Circuits Manufacturing", Nov. 1976, vol. 15, No. 11, pp. 46–52.

Primary Examiner—William H. Grieb
Attorney, Agent, or Firm—Gerald J. Ferguson, Jr.; Joseph J. Baker

[57] ABSTRACT

Apparatus including a planar support having a plurality of terminations such as plated through holes arranged therein in an array and a plurality of sensing devices respectively associated with the terminations for measuring a physical quantity thereat such as temperature. The resulting structure is useful for training a person in a manual skill such as soldering. Also disclosed is a common connector plug for receiving at one side of the support a plurality of electrical leads from the sensing devices and an analyzer and indicator connected to the common plug for measuring the time required for the temperature and/or pressure at one of the terminals to rise from an initial value to a final value, the terminal being that to which a device such as a soldering iron is applied to effect the soldering of an electrical connection thereat. If the trainee successfully raises the temperature from the initial to final value within a desired period of time, an indication is made of this fact to provide positive reinforcement for the trainee.

73 Claims, 10 Drawing Figures

CIRCUITRY FOR TEACHING SOLDERING AND PRACTICE CIRCUIT BOARD FOR USE THEREWITH

BACKGROUND OF THE INVENTION

This invention relates to printed circuit boards or the like which may be used for teaching a manual skill such as soldering including circuitry for indicating to the trainee whether or not a good joint has been soldered to thereby provide positive or negative reinforcement.

The assignee of the subject application has promoted efforts to teach manual skills by including the trainee in the feedback loop present when such a skill is performed. That is, for example, in the soldering art, an important requirement is not to overheat the terminal to which the lead of a component is being soldered. However, for the neophyte it is difficult for him to visually determine when to stop the soldering action and thus, prevent overheating. The assignee of the subject application has taught trainees that they can observe the rate at which the solder melts to thereby leave the iron on the joint long enough to form an effective connection while at the same time not so long as to overheat the printed circuit board or the like.

From the foregoing, it can be seen that the trainee is included in the feedback loop since it is his observation of the melting solder which determines his course of action. There are known soldering irons which control the temperature of the tip within a preset range in an effort to provide a constant amount of heat to the joint being soldered in the hope that such temperature control will provide high quality joints in spite of the lack of soldering skills on the part of the operator. As can be appreciated, temperature control of the tip involves a feedback loop which does not include the operator. However, by excluding the operator from the loop, the objective of providing joints of consistent high quality cannot be achieved. That is, even though the temperature of the tip is maintained at a substantially constant level, there are still many other factors which determine how much heat will be delivered to the joint. Some of these factors are not only the temperature of the tip but also the specific heat, thermal conductivity and density thereof. Also there is the surface condition of the tip which typically may be coated with an oxide film. Further, there is the recovery rate of the tip. Apart from the tip, there is the temperature of the printed circuit board, the component lead and the other parts associated with the terminal where the joint is being soldered. The latter may be termed the cold body as opposed to the iron and its tip which may be termed the hot body. Like the hot body, the thermal conductivity, specific heat, density and surface condition of the cold body are also factors as to how much heat is delivered to the junction being soldered. In addition to the individual factors for the hot and cold bodies, there are also common factors such as the contact area between the hot and cold bodies, windage (a draft may be present at a joint) and the time of contact. From the foregoing it can be seen that the heat transfer mechanism from the soldering iron tip to the joint is a complicated one. Further, heat from the tip can be lost in many ways other than through the area of contact between the hot and cold bodies. Accordingly, simple temperature control of the tip will not ensure an effective solder joint. This can only be done by including the operator in the feedback loop.

SUMMARY OF THE INVENTION

It is thus an object of this invention to provide apparatus for teaching a manual skill such as soldering to a trainee whereby once the skill has been taught, solder joints of consistently high quality can be achieved due to the fact that a skilled operator is included in the feedback loop present when each joint is made.

It is a further object of this invention to provide apparatus of the foregoing type which includes a training board for teaching soldering skills.

It is a further object of this invention to provide a training board of the foregoing type having a plurality of terminals thereon and a plurality of temperature sensing devices respectively associated with the terminals to monitor the trainee's performance at each terminal where the soldering of a joint is attempted.

It is a further object of this invention to provide a common connector plug for use with said training board whereby all of said sensing devices can be brought out from the board through the plug.

It is a further object of this invention to provide analyzer and indicator circuitry responsive to the temperature sensing devices on the board to thereby determine whether the trainee has raised the temperature at the joint from an initial temperature to a final temperature within a time period corresponding to a desired rate of melting the solder. As stated hereinbefore, a very important indicator to the operator as to whether an effective joint has been formed is the rate at which the solder melts. Accordingly, whether he has correctly observed the rate at which the solder melts is monitored by the apparatus of the present invention and an indication is given as to whether his observation has been such as to effect a high quality joint.

Thus, it is a further object of this invention to provide an indication of the foregoing type whereby either positive or negative reinforcement is given to the trainee depending upon his ability to observe the rate at which the solder melts.

It is a further object of this invention to provide a count of the number of joints the trainee successfully solders out of the total number of terminals on the aforesaid board to thereby provide further reinforcement and/or to provide a means for testing the skills of the trainee or any operator involved in the assembly and/or repair of electrical circuitry.

It is a further object of this invention to provide means for recording the performance of a plurality of trainees (or other personnel) where each trainee is provided with one of the aforesaid boards and the output signals from the aforesaid temperature sensing devices are recorded and where the recording(s) are subsequently analyzed at a central location.

It is a further object of this invention to provide means for indicating the pressure and/or temperature (for example) at which various types of damage occur to the workpiece being worked to provide further reinforcement to the trainee.

It is a further object of this invention to extend the foregoing objects to other manual skills such as, but not limited to, desoldering, welding or any skill where an operator applies a device to a workpiece to effect a change in a physical quantity at the workpiece where the physical quantity should change from an initial value to a final value within a predetermined period of time in order for the task to be successfully accomplished.

Other objects and advantages of this invention will be apparent from a reading of the following specification and claims taken with the drawing.

DETAILED DESCRIPTION OF PREFERRED EMBODIMENTS OF THE INVENTION

Reference should be made to the drawing where like reference numerals refer to like parts.

Figure 1:
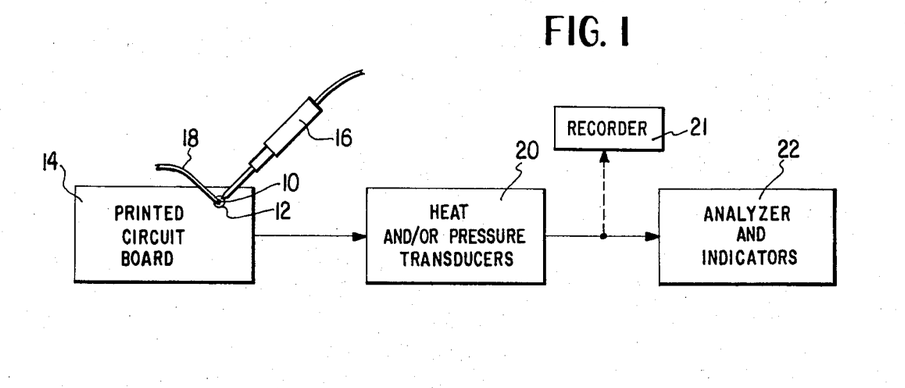
FIG. 1 is a block schematic diagram of an illustrative overall apparatus in accordance with the invention for teaching a manual skill such as soldering.

The overall system and operation of the invention is generally indicated in FIG. 1 wherein a component lead 10 is being soldered to a terminal (or termination or junction) 12 of a printed circuit board 14, the lead typically extending through a hole in the board, a soldering iron 16 being employed to heat the junction and melt solder 18 to thereby effect the desired connection. Although the invention as described hereinafter will be with respect to the soldering of joints on a printed circuit board, it is to be understood the invention is applicable to (a) other areas such as desoldering, welding, etc., (b) circuit connections other than those on a single or double sided printed circuit board such as multi-layer boards, ceramic printed circuits, etc. and (c) various terminations such as plated through holes, unsupported holes, funnelets, eyelets, stand-offs, etc.

As discussed hereinbefore, the heat supplied to the joint must reach a desired temperature range within a given time interval so that the solder melts neither too fast nor too slow. In order to sense thermal conditions and changes at the joint, a heat transducer(s) is employed where one or more transducer may be employed for each termination on board 14. Further, the stress created at the joint may also be sensed by appropriate pressure transducers. The electrical output signals from the transducers 20 are applied to an analyzer and indicator 22, a primary purpose of which is to indicate to a trainee whether or not he has satisfactorily performed a particular operation such as the soldering of a joint.

Figure 2:
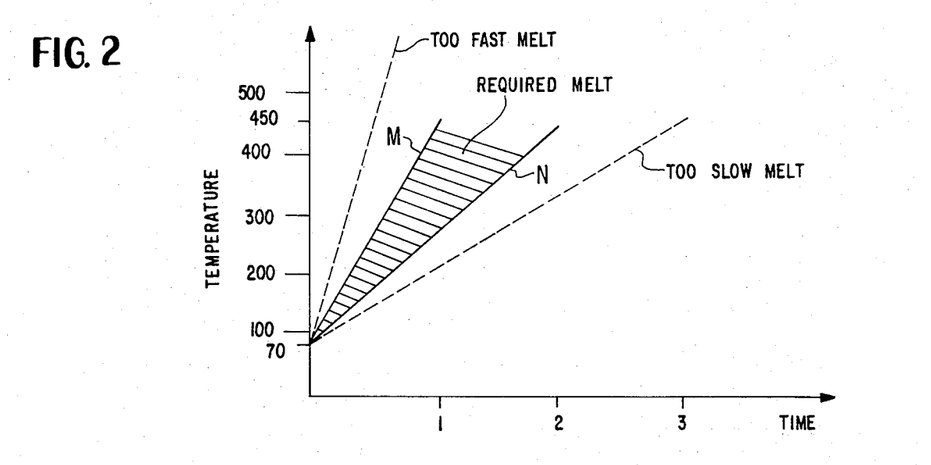
FIG. 2 is a graph which illustrates an illustrative preferred range at which solder should be melted to form a high quality joint.

FIG. 2 is a graph which indicates a type of analysis that can be performed by analyzer 22 where the values selected for the parameters of temperature and time are illustrative and may vary widely depending upon such factors as the particular kind of solder used. In FIG. 2, the lined area between lines M and N indicates a range of heat supply rate to the joint which must be maintained to effect a high quality connection. Assuming, room temperature is 70° and the joint is to be raised in temperature to 450°, the lines M and N indicate the temperature rise must occur within one to two seconds. If the temperature increase is too fast, a "strike" melt occurs and the quality of the connection is impaired assuming a connection has been effected. If the rate of heat supply is too slow, a "mush" melt occurs and heat will tend to diffuse through the board thereby tending to damage adjacent components. Further, the quality of the joint may be impaired with respect to a joint formed within the required melt range defined by the lines M and N. Thus, as described in detail hereinafter a primary purpose of anaylzer 22 is to determine for each junction whether or not heat has been supplied within the range defined by the lines M and N.

Figure 3:
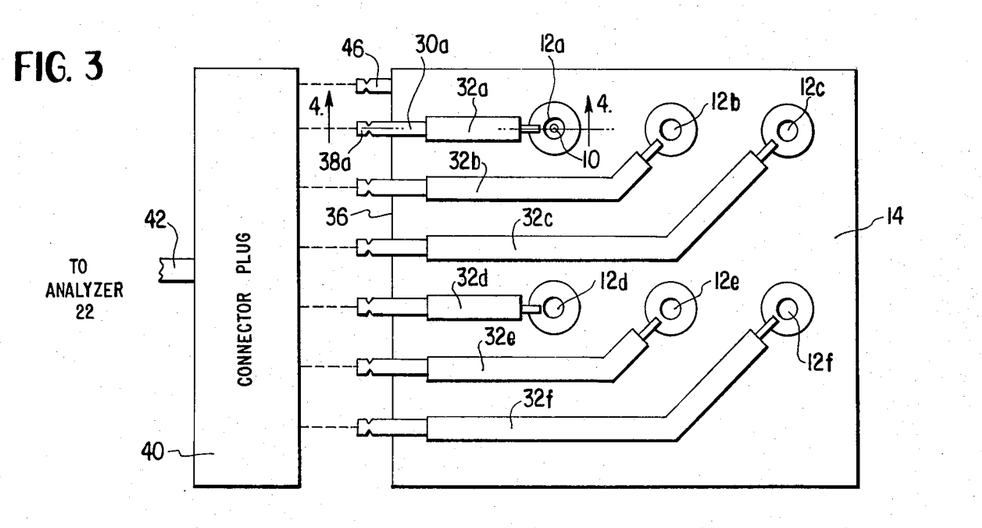
FIG. 3 is a schematic plan view of an illustrative training board together with associated connector plug in accordance with the invention.
Figure 4:
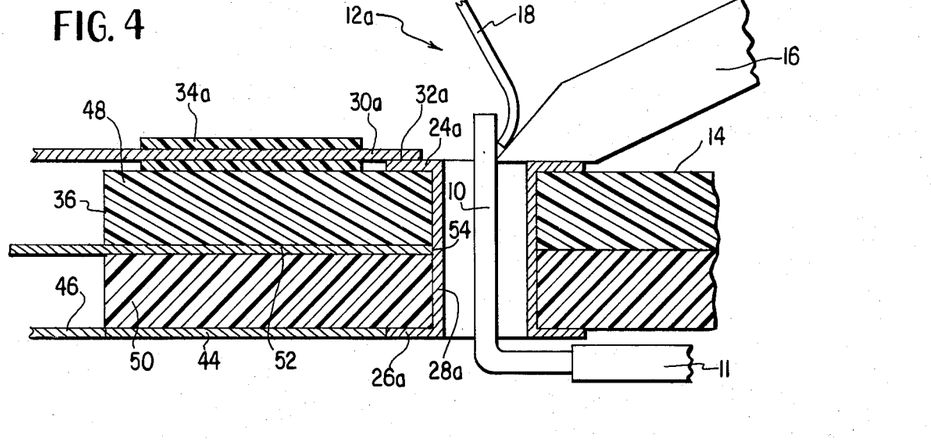
FIG. 4 is a cross-sectional view along the line 4—4 of FIG. 3.

In FIGS. 3 and 4, there is illustrated a training board corresponding to printed circuit board 14—that is, board 14 is specially constructed for the purpose of training students in the art of soldering, although it is to be understood that any printed circuit board or other circuit construction could be employed in accordance with the present invention. In FIG. 3, there are shown six plated through holes 12a-12f where the number of holes can vary as can the arrangement thereof, the FIG. 3 arrangement being selected for illustrative purposes only. In FIG. 4, there is shown a cross-sectional view of plated through hole 12a including pads or lands 24a and 26a and side 28a. Typically plated through holes 12a-12f comprise electroless copper. Attached thereto is a metal foil (or wire) 30a made of iron or constantan or some other metal different than that of the plated through hole whereby a thermocouple junction is formed at 32a. Foil 30a may be provided with insulation 34a, the foil passing to a terminal edge 36 of the board 14. As indicated in FIG. 3, foil 30a may be provided with a tab 38a to facilitate connection of the terminal end of the block to a connector plug 40 which connects the board 14 to analyzer 22 via a multi-wire cable 42, such plugs being well known, they basically being either of the edge type, the pin and socket type or the fork type.

Thermocouple junctions are also formed at holes 12b-12f in exactly the same manner as is the case at hole 12a. The thermocouple junctions may be formed by an electrical arc, flame heating, soldering, swagging, welding, brazing, beading or butt-welding. All thermocouple junctions are connected to connector plug 40. To complete the thermocouple junction circuit, the entire bottom of board 14 may be plated with copper or the like as indicated at 44 in FIG. 4, the plate 44 being brought out as a single tab 46 at terminal edge 36 as shown in FIG. 3. Thus, the circuit for hole 12a is completed from wire 30a through junction 32a and side 28a of the hole to plate 44. Alternatively, individual strips (not shown) can be connected from each hole 12 to common tab 46 or to enhance isolation, a pair of leads can be connected from each hole 12 to plug 40.

Thus, when iron 16 is applied to land 24a and lead 10 of component 11 to heat these elements and melt solder 18 and thereby join lead 10 to side 28a, the thermal conditions at the joint can be monitored by thermocouple junction 32a to thereby provide analyzer 22 with information needed to effect the analysis illustrated by FIG. 2. As indicated in FIG. 4, board 14 may be a multi-layered board comprising layers 48 and 50, the conductive pattern interposed between these boards not being shown for purposes of clarity. Rather, there is shown a further thermocouple junction wire 52 which is made of a material similar to that of 30a. Thus, a further thermocouple junction may be formed at 54 to sense the temperature in the interior of the board adjacent side wall 28a where the junction is being formed. Hence, this further temperature information may also be provided (or it may be the only information provided) to analyzer 22 as will be described in more detail hereinafter. Further, stress information may also be provided via a strain gauge through plug 40 to anaylzer 22 as will now be described in the embodiments of FIGS. 5 and 6 although it is to be understood that a strain gauge of the type employed in the embodiments of FIGS. 5 and 6 could also be employed in the embodiments of FIGS. 3 and 4.

Figure 5:
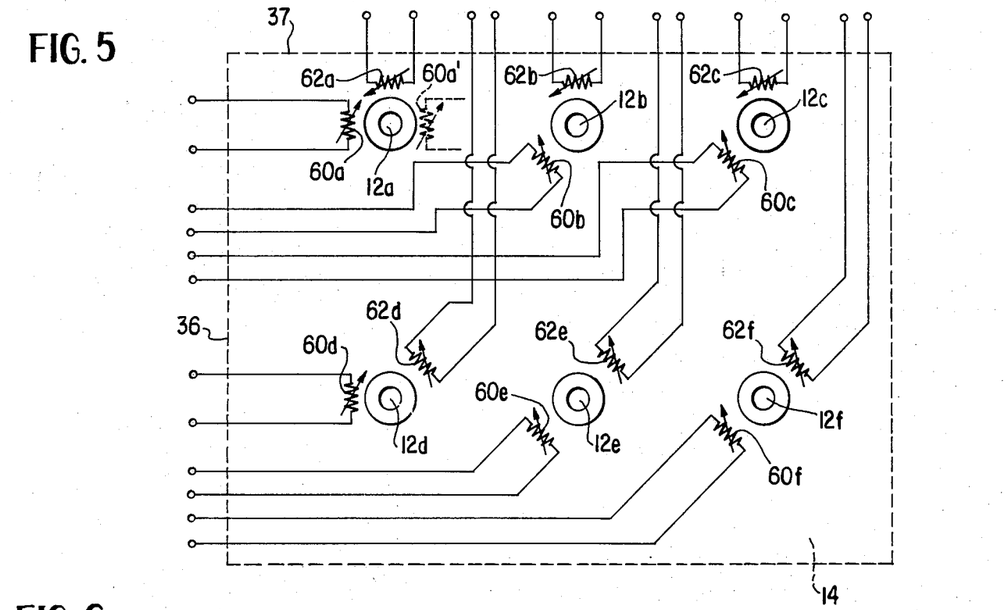
FIG. 5 is a schematic plan view of an illustrative modified training board.
Figure 6:
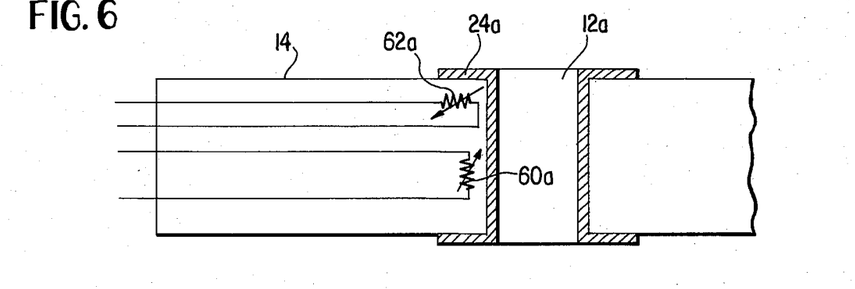
FIG. 6 is a schematic cross-sectional view of one of the terminals of the FIG. 5 board.

In FIGS. 5 and 6, current varying, sensing devices are employed rather than the voltage generating, thermocouples of FIGS. 3 and 4, it being understood either or both may be employed if so desired. Thus, in FIG. 6 plated through hole 12a has the ambient temperature thereof sensed by a thermister 60a and the strain thereat sensed by a piezoresistor 62a, see "Semiconductor Circuit Elements" by T. D. Towers and S. Libes, Hayden Book Co., Inc., 1977, pp. 8 and 212-216 for a discussion of such elements where it is known, for example, to embed thermisters in motor windings or the like to effect electrical motor overheating protection. Accordingly, the sensing elements 60a and 62a may be embedded in board 14 during manufacture thereof. Of course, the positions of elements 60a and 62a may be interchanged or they may be positioned where desired. Further, other sensing devices may also be embedded in the board to effect, for example, a number of temperature readings at different points, as discussed hereinbefore with respect to FIG. 4. Also the sensing elements may be disposed on the outside of board 14 if so desired.

FIG. 5 schematically illustrates how temperature sensing devices 60a-60f may be connected to terminal side 36 of board 14 while the pressure sensitive elements 62a-62f may be connected to side 37. Connector plugs corresponding to plug 40 may then be attached to the respective sides 36 and 37 to supply the information from board 14 to analyzer 22. The wiring arrangement of FIG. 5 is merely illustrative and numerous other arrangements can be employed. For example, the wires from devices 60a-60c may be vertically disposed with respect to one another through the board rather than the horizontal disposition thereof across the board shown in FIG. 5. The same applies to the other wire groups disposed at sides 36 and 37. Further, the wires from devices 60a-60f and 62a-62f may be brought to the same side 36 whereby a single connector plug 40 would be employed.

Figure 7A:
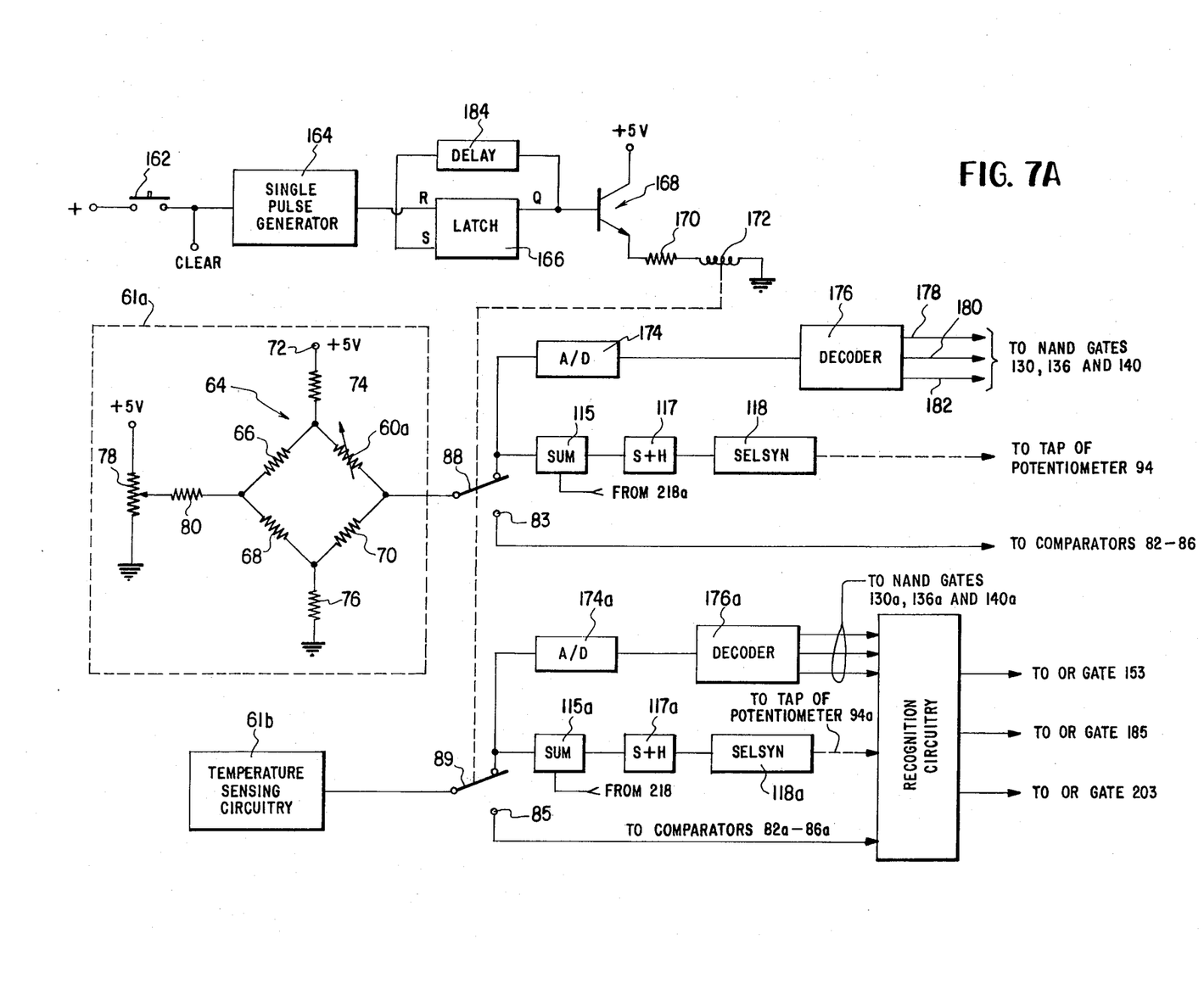
FIGS. 7A and 7B together comprise a block/schematic diagram of illustrative analyzer and indicator circuitry in accordance with the invention.
Figure 7B:
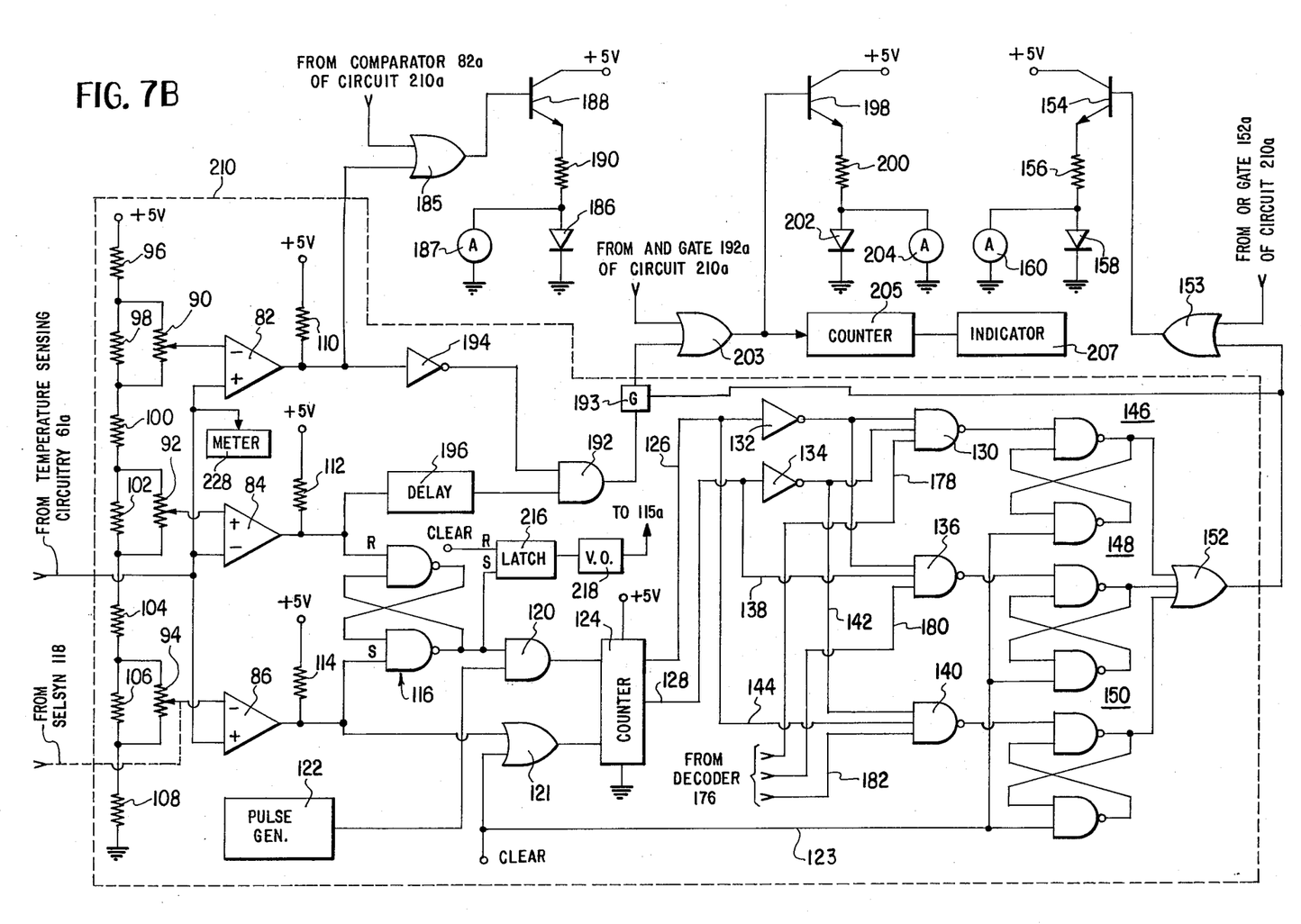

Reference should now be made to FIGS. 7A and 7B which depict illustrative circuitry for implementing the functions of analyzer 22. Temperature sensing circuitry 61a includes temperature sensing device 60a which comprises one leg of a resistance bridge 64 as shown in FIG. 7A. The other legs of the bridge may be fixed resistors 66, 68 and 70. It would also be possible to dispose (or embed) the entire bridge at terminal 12a where the resistor 70 could also be a thermister. A fixed potential of typically 5 volts is applied from terminal 72 across the bridge to ground via resistors 74 and 76. Connected to another one of the bridge terminals is a potentiometer 78 via a resistor 80. The output terminal of the bridge is connected to comparators 82, 84 and 86 (see FIG. 7B) via relay armature 88. The other input terminals of the comparators are connected to potentiometers 90-94, the voltages across the potentiometers being established by potential dividing resistors 96-108. The outputs of comparators 82-86 are connected to a typically 5 volt bias source via resistors 110-114. The outputs of comparators 84 and 86 are respectively connected to the RESET and SET inputs of a latch indicated at 116. Latch 116 provides a measure of the time required to heat the printed circuit board junction to a desired final temperature. That is, potentiometer 92 is set to a temperature corresponding to the desired final temperature such as the 450° temperature of FIG. 2. Potentiometer 94 is set to a temperature slightly above the temperature of the junction prior to the application of heat thereof. This is effected by a selsyn 118 in a manner which will be described in more detail hereinafter with respect to FIG. 8. Thus, as the voltage increases at the output of bridge 64 (due to junction temperature increase), comparator 86 will first set latch 116 and when the temperature finally reaches the desired temperature as established by potentiometer 92, comparator 84 will reset the latch. Accordingly the duration of time latch 116 is set corresponds to the time required to raise the junction temperature from its initial value to the desired final value.

The SET output of latch output is applied to AND gate 120 as is the output of a pulse generator 122, which generates a train of equally spaced pulses in a well known manner. As long as latch 116 is set, the output pulses from generator 122 are applied to a counter 124. For purposes of illustration, it will be assumed counter 124 has only two outputs 126 and 128, which may assume in binary notation the states of 0, 1, 2 and 3. Further, it will be assumed for sake of illustration the repetition rate of output pulses from generator 122 is such that if no output pulses are counted while latch 116 is set, the rate of junction temperature increase is to the left of line N in FIG. 2. That is, it may be that the rate of temperature increase falls within the required range defined between lines M and N of FIG. 2 or it may be that the temperature rise is too fast as indicated by the fast melt line of FIG. 2. (Circuitry will be described hereinafter for distinguishing between a "too fast" melt and a melt defined by the lines M and N.) If a count of one or more appears at the output of counter 124, this may be an indication the rate of heat supply was too slow as indicated by the slow melt line of FIG. 2. This, as will be described in detail hereinafter, will depend on what the initial junction temperature was when heat from the soldering iron was applied thereto. Accordingly, output lines 126 and 128 are connected to (a) NAND gate 130 via inverters 132 and 134, (b) NAND gate 136 via inverter 132 and line 138 and (c) NAND gate 140 via inverter 134 and lines 142 and 144. NAND gates 130, 136 and 140 are respectively responsive to the counts of 3, 2 and 1. Latches 146, 148 and 150 respectively latch the outputs of NAND gates 130, 136 and 140. The latches are applied to OR gate 152, the output of which is applied to OR gate 153 which in turn drives a transistor 154 connected between the 5 volt supply and a resistor 156, a light emitting diode (LED) 158 and an audible alarm 160. Energization of transistor 154 by any of the NAND gates 130, 136 and 140 may cause a panel light (corresponding to LED 158) to indicate a "too slow"

melt. Further, alarm 160 may also be actuated to produce a characteristic tone.

In order to commence operation of the analyzer, the trainee prior to placement of the iron on a junction to be soldered closes push button switch 162 (see FIG. 7A), which may be a floor mounted, foot pedal, a panel switch, etc. Closure of switch 162 energizes a single pulse generator 164 which may be of a monostable flip-flop. The output pulse from generator 164 is applied to the reset input of a latch 166 whereby the Q output thereof changes to actuate transistor 168. The transistor is connected between the 5 volt supply, a resistor 170 and a relay coil 172. Thus, actuation of transistor 168 energizes coil 172 whereby the armatures 88 and 89 are switched to the position shown in FIG. 7A. Accordingly, the output voltage from resistance bridge 64 is initially applied to selsyn 118 via a summing circuit 115 and a sample and hold circuit 117 and to analog-to-digital convertor 174. The output of selsyn 118 mechanically positions the tap of potentiometer 94 to thereby preset the potentiometer to a value slightly greater than the initial temperature of the junction. See "Radar Circuit Analysis" Air Force Manual No. 52-8, 1951, pp. 13-1 through 13-18 for a description of selsyns. That is, when the board 14 is used for the first time, all terminals 12 thereof will initially be at ambient room temperature—for example, 70° F. However, after the first joint has been soldered, some of the heat applied thereto will diffuse through the board to adjacent terminals. Accordingly, the initial temperature of these latter terminals will not be at room temperature but rather some elevated temperature. As soldering at different terminations continues, more heat will build up at the terminations to be soldered. Accordingly, less time is required to raise the temperature of a joint to the desired final temperature (450°, for example) when the hole temperature is initially elevated with respect to ambient room temperature. This is accounted for by the presetting of potentiometer 94 by selsyn 118 and by converter 174 (and circuitry controlled thereby) as will be explained in further detail hereinafter.

Converter 174 is also responsive to the initial temperature at hole 12a to provide a digital representation thereof to decoder 176, the outputs of which are respectively applied to NAND gates 130, 136 and 140 of FIG. 7B over lines 178, 180, 182. If, as will be explained hereinafter with respect to FIG. 8, the ambient temperature at hole 12a is within a predetermined range starting from room temperature, line 178 will be energized to condition NAND gate 130. Hence, only a count of 3 or more by counter 124 would be sufficient to actuate indicator 158 and alarm 160. If the initial temperature of hole 12a is in a range above the aforementioned range, line 180 is energized to condition NAND gate 136. Accordingly, a count of 2 or more would then be sufficient to actuate indicator 158 and alarm 160. If the initial temperature is in a yet higher range, line 182 conditions NAND gate 140 whereby a count of only 1 will be sufficient to actuate indicator 158 and alarm 160.

Once potentiometer 94 has been preset by selsyn 118, latch 166 is reset by the Q output thereof via a delay 184, the delay of 184 being such that selsyn 118 has sufficient time to drive the tap of potentiometer 94 over the full range thereof if necessary.

When latch 166 is set by the output of delay 184, relay coil 172 is de-energized whereby armatures 88 and 89 make contact with terminals 83 and 85. The foregoing presetting of potentiometer 94 occurs almost immediately after the trainee closes switch 162. Accordingly, the trainee will not have had an opportunity to contact junction 12a with a soldering iron prior to the switching of armature 88 to terminal 83. Hence, the armature 88 will be connected to terminal 83 when the trainee contacts the junction with the iron (or desolderer).

As described above, the voltage output from bridge 64 will increase as the junction temperature rises. When the increasing temperature exceeds the thresholds established at potentiometers 92 and 94, latch 116 will be set and reset as described above. If heat is applied too fast to the joint, the temperature will exceed a predetermined maximum as established at potentiometer 90 inasmuch as the operator is unable to prevent the temperature rise past the maximum due to the large amount of heat being applied to the junction in a very short time. Thus, when the potential established by potentiometer 90 is exceeded, comparator 82 energizes LED 186 and/or alarm 187 via OR gate 185, transistor 188 and resistor 190. LED 186 may correspond to a "too fast" light on a control panel while alarm 187 may provide a characteristic tone.

Comparator 82 is also applied to an AND gate 192 via an inverter 194. Also applied to AND gate 192 is the output of comparator 84 via delay 196. The output of AND gate 192 is connected to a transistor 198. Connected across the transistor is the 5 volt supply, a resistor 200, a LED 202 and an alarm 204. The purpose of LED 202 and alarm 204 is to indicate to the trainee that he has soldered a high quality joint—that is, he has effected a heat rise at the joint defined by lines M and N of FIG. 2 and that the temperature has not exceeded the predetermined maximum temperature established at potentiometer 90—that is, the temperature rise has not been too fast. Accordingly, when the output of comparator 84 changes to indicate the desired temperature of 450° has been reached, this signal is applied via delay 196 to the AND gate. As long as the output of comparator 82 does not change, the input conditions for AND gate 192 will be satisfied and indicator 202 and alarm 204 will be actuated to indicate a good solder. However, if the output of comparator 82 changes due to a "too fast" melt, the output of inverter 194 will be low and thus, the input conditions for AND gate 192 will not be satisfied when the output of comparator 84 arrives at the gate via delay 196. Accordingly, indicators 202 and 204 will not be energized while indicators 182 and 187 will be, as described above.

Heretofore, the description has been restricted to terminal 12a. However, the circuitry of FIGS. 7A and 7B is such that the trainee may effect a solder connection at any terminal 12 of board 14. Accordingly, there is also shown in FIG. 7A temperature sensing circuitry 61b which corresponds to circuit 61a. As indicated above, armature 89 is ganged with armature 88 and initially connects circuit 61b to selsyn 118a and analog/digital converter 174a in the same way armature 88 is connected to selsyn 118 and converter 174 as described above. The outputs of decoder 176a, selsyn 118a and terminal 85 are connected to a recognition circuit 210a, which corresponds to the circuitry enclosed in the dotted line of FIG. 7B denoted as 210. The circuitry of 210a is exactly the same as that of 210 and thus, for example, OR gate 152a (not shown) of circuit 210a corresponds to OR gate 152 of circuit 210. OR gate 152a is connected to OR gate 153 of FIG. 7B. Further, comparator 82a is connected to OR gate 185 of FIG. 7B and AND gate 192a is connected to OR gate 203 of FIG. 7B. Hence, since temperature sensing circuit 61a of FIG. 7A monitors termination 12a of FIG. 5 while temperature sensing circuit 61b monitors termination 12b and since recognition circuits 210 and 210a are both connected to OR gate 153 of FIG. 7B, indicator 158 is responsive to thermal conditions at either of the terminations 12a or 12b to provide a "too slow" melt indication. The foregoing also applies to "too fast" melt indicator 186 and "correct" melt indicator 204. Although the foregoing has been illustrated for only two terminations (12a and 12b), it is to be understood the circuitry of FIG. 7A and 7B would be repeated n times for n junctions in the same manner as the circuitry for terminal 12b substantially repeats that for terminal 12a.

An indication may also be provided as to whether the trainee has correctly soldered a predetermined number of joints. That is, assume board 14 has 32 terminations and that the trainee should successfully solder 28 of the 32 terminations to thereby display a certain level of proficiency. Accordingly, a counter 205 (FIG. 7B) is incremented by one each time a successful joint is made as indicated by an output from NAND gate 192 (or 192a, 192b, etc.). Indicator 207 may be preset to respond to the counter output by displaying an appropriate indication if the 28 successful joints are made. Indicator 207 may be of the type corresponding to inverters 132 and 134 and NAND gate 130, for example. Accordingly, counters 205 and 207 (together with indicators 158, 160, 186, 187, 202 and 204) provide means for positively reinforcing successful performances and negative reinforcement for discouraging non-successful ones.

As stated hereinbefore, the indicators 158, 186, 202 and 207 are commonly connected to terminations 12a–12f via recognition circuits 210a–210f. Accordingly, means must be provided for ensuring that the indicators are not responsive to the thermal conditions at more than one termination at any given time. Thus, the operation of the circuitry of FIGS. 7A and 7B is such that a trainee may attempt to solder a joint at any termination on board 14 in any order. That is, for example, referring to FIG. 5, the trainee may first attempt to solder a joint at termination 12b. Next, he may attempt one at 12a and then 12f. As stated hereinbefore, the initial temperature of board 14 will be that of room temperature (typically 70° F.). Accordingly, the initial temperature at termination 12b is approximately 70°, as is the temperature at terminations 12a and 12c–12f. Thus, in FIGS. 7A and 7B, when switch 162 is closed, temperature sensing circuits 61a and 61b will both provide output indications corresponding to room temperature. At this time a CLEAR signal will be transmitted to counter 124 via OR gate 121 (and 121a) and latches 146–150 and 146a–150a) via line 123 (and 123a) thereby clearing these circuits preparatory to the next soldering operation, as is a latch 216 to be described hereinafter. As described hereinbefore, single pulse generator 164 is also actuated at this time to reset latch 166 and thus switch armatures 88 and 89 to the positions shown in FIG. 7A via relay coil 172. Thus, selsyns 118 and 118a respectively position the taps of potentiometers 94 and 94a to positions related to the initial ambient temperatures of terminations 12a and 12b. That is, the potentiometer tap positions are greater by a predetermined amount than the actual measured temperatures. For purposes of illustration, this amount is chosen to be 30°. Hence, since the initial temperature at junctions 12a and 12b are assumed to be 70°, the potentiometer tap positions thereof will be set at 100° by selsyns 118 and 118a.

By so setting the tap positions, the circuitry of FIGS. 7A and 7B can determine which of the terminations the trainee has positioned his soldering iron by sensing the potentiometer whose threshold is exceeded first. Thus, it has been assumed above the trainee initially attempts to solder a joint at termination 12b. Accordingly, the temperature rise at 12b will be greater than that at termination 12a. Hence, the output voltage from temperature sensing circuitry 61b will increase more rapidly than the output of circuit 61a. As the output voltage from circuit 61b increases, it soon exceeds the threshold established by potentiometer 94a and thus only recognition circuit 210a is effective to actuate one or more of the indicators 158, 186, 202 and 207. Although 30° has been chosen in the above example, the temperature differential can be so chosen as to ensure that the temperature at no other terminal will exceed the temperature differential and thus the threshold at only one of the potentiometers 94 will be exceeded. Hence, further protection for ensuring that only one indication and one count (for counter 205) is given per attempted solder is illustrated in FIG. 7B where the SET output of latch 116 (or 116a) sets latch 216 (or 216a) which in turn actuates a voltage override circuit 218 (or 218a). The voltage override circuit output may be a DC voltage which corresponds to the maximum possible setting potentiometers 94 can be set to where this maximum may exceed any temperature the terminals 12 can reasonably be expected to rise to even when extremely overheated. The voltage override is applied to selsyn 118a (118, see FIG. 7A) via summing circuit 115a (115) and sample and hold circuit 117a (117) to reposition tap 94a (94) from its initial ambient temperature position to the maximum potentiometer position. Accordingly, if the temperature at adjacent termination 12a rises more than 30° above its initial temperature due to diffusion of heat thereto from termination 12b, comparator 86a will nevertheless not set latch 116a since the threshold now established by potentiometer 94a substantially exceeds to temperature junction 12a has risen to. Thus, only one indication and count per attempted solder is effected. The only action which will permit another indication or count to occur is the reactuation of switch 162 by the trainee. When board 14 contains a large number of terminals, voltage override would be applied from override circuit 218a to the selsyns associated with all other terminals. The foregoing also applies to voltage override circuit 218 (if it were actuated first) where the output thereof would be applied to selsyn 118a and all other selsyns except its associated selsyn.

Once a joint has been soldered at termination 12b, an attempt to make a joint is next attempted at termination 12a as assumed above. The ambient temperature at termination 12a is no longer that of room temperature, assuming the operator proceeds to termination 12a shortly after the making of the 12b joint. This would normally be the case where the worker usually proceeds quickly from one termination to the next while either assembling or repairing a circuit. Accordingly, it is assumed that the temperature at junction 12a has risen to a temperature of 200° F., this temperature being chosen for ease of illustration. Thus, when the operator actuates switch 162, temperature sensing circuit 61a will apply a voltage through armature 88 to selsyn 118 which will cause potentiometer 94 to be preset to a temperature of 230°. The override from voltage override circuit 218a is no longer present since latch 216a is reset by the CLEAR signal generated when switch 162 is actuated. Also the thermal conditions at termination 12b will not interfere with the measurement occurring at junction 12a. That is, once the soldering iron is removed from junction 12b to 12a, the temperature will tend to fall fairly rapidly at junction 12a. Thus, although the initial temperature set into potentiometer 94a at the time switch 162 is actuated will be quite high (especially if the trainee moves to junction 12a immediately from 12b), the fact remains the temperature will continue to drop at junction 12b and there is little or no likelihood the temperature thereat could increase again (due to heat diffused from junction 12a) to the threshold temperature preset into potentiometer 94a before the threshold at potentiometer 94 is exceeded. And, as stated above, once the potentiometer 94 threshold is exceeded, override voltage from circuit 218 causes the setting of potentiometer 94a to its maximum position thereby ensuring latch 116a will not be set again—unless the soldering iron is again placed in contact with terminal 12b after switch 162 has been actuated.

Figure 8:
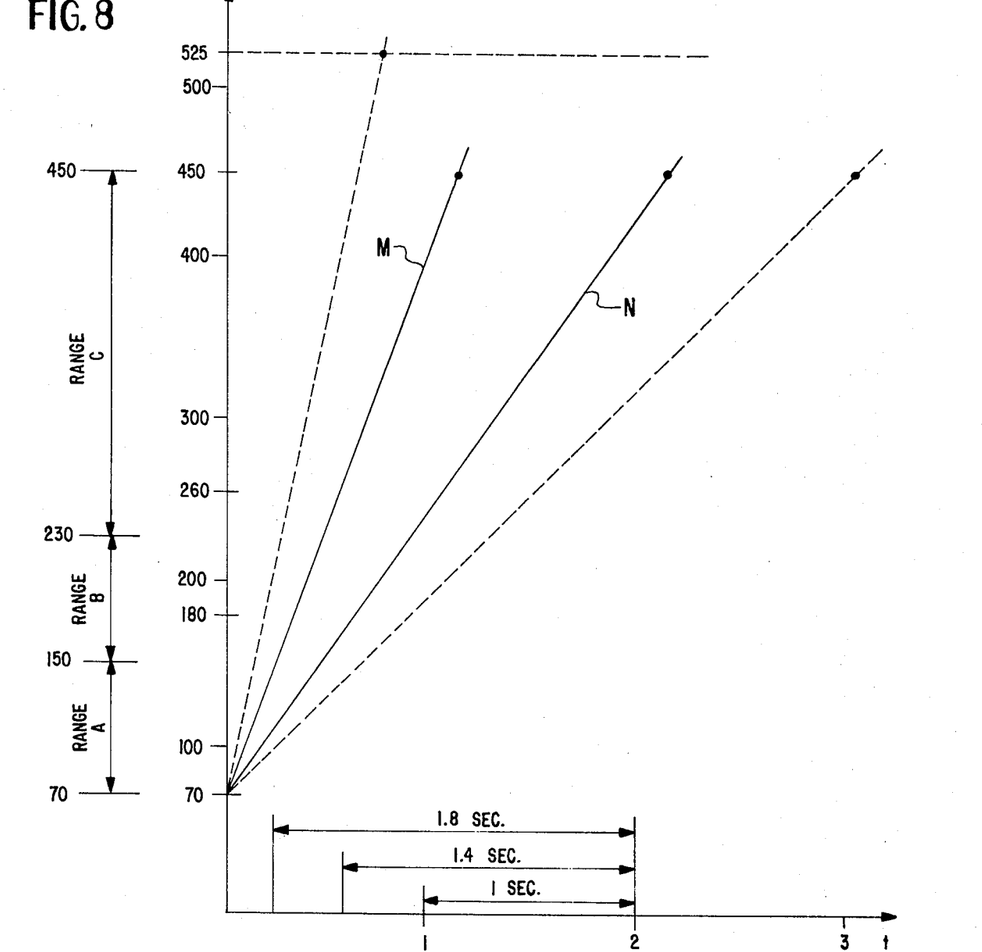
FIG. 8 is a graph corresponding to that of FIG. 2 which illustrates how less time is allowed the trainee to raise the temperature of the junction to the predetermined final value when the initial value is greater than that of ambient room temperature.

As assumed above, the initial temperature at junction 12a is assumed to be 200°. This temperature is shown in FIG. 8 and it is noted that it falls within the range B indicated along the side of the graph. As discussed hereinbefore, depending upon the initial temperature, the amount of time alloted to the trainee varies. In other words, he has more time to bring the terminal temperature up to 450° when the initial temperature is 70° than when it is 200°. In fact, if the initial temperature is within the range of 70°-150° (range A), he has 1.8 seconds to effect the requisite temperature rise while if the initial temperature is between 150°-230° (range B), the allowed time is 1.4 seconds and if the initial temperature is above 230° (range C), he has but one second to effect the desired temperature rise. The foregoing temperature ranges and times are illustrated in FIG. 8 with respect to line N, it being understood the selected values are for purposes of illustration only. As described hereinbefore, decoder 176 and the circuitry associated therewith is responsive to the initial temperature to determine which of the FIG. 8 times will be selected—that is, how much time the trainee will be allowed to bring the joint to final temperature. In particular, A/D convertor 174 may be such as to output one binary number during range A and other numbers during ranges B and C. The decoder 176 would then simply provide an output on either line 178, 180 or 182 depending on the binary number outputted by convertor 174. Decoder 176 may be of the general type disclosed in "How to Use Integrated Circuit Logic Elements" by Jack W. Streater, Howard W. Sams and Co., 1976, Inc., pp. 66, FIGS. 4-25. Thus, the 200° temperature sensed by circuit 61a will be decoded by decoder 176 to energize line 180 and thereby condition NAND gate 136.

With NAND gate 136 so conditioned and potentiometer 94 preset to 230° (as assumed above), latch 166 is set as described hereinbefore whereby armature 88 switches to contact 83. The foregoing occurs relatively instantaneously after the trainee has actuated switch 162. The trainee then places the soldering iron in contact with terminal 12a and commences to solder lead 10 thereto. If the operator takes more than 1.4 seconds to raise the joint temperature to 450° from 200°, counter 124 will reach a count of 2 whereby the input conditions for NAND gate 136 will be satisfied. This in turn sets latch 148 and energizes LED 158 and alarm 160 to indicate a "too slow" melting of the solder. Accordingly, the trainee receives negative reinforcement to discourage such slow performances in the future.

If the operator does successfully raise the junction temperature to 450° from the initial 200° temperature within the time limit of 1.4 seconds, the count contained within counter 124 will be either 0 or 1. However, only NAND gate 140 is responsive to a count of 1, none of the NAND gates 130, 136 and 140 being responsive to the count of 0. But NAND gate 140 has not been conditioned at this time by decoder 176. Hence, even if counter 124 contains a count of 1, there will be no output from NAND gate 140 to energize LED 158 and alarm 160. Thus, when the desired final temperature of 450° is reached as established by potentiometer 92, latch 116 will be reset thereby preventing any more pulses from generator 122 from reaching counter 124. Accordingly, energization of "too slow" LED 158 and alarm 160 is inhibited if the trainee raises the junction temperature to 450° within 1.4 seconds. Again it should be emphasized the counts to which NAND gates are responsive (namely 1, 2 and 3) have been chosen for ease of illustration and other logic circuitry may be employed which would be responsive to larger counts.

Once the junction temperature reaches 450°, "correct" LED 202, alarm 204 and counter 205 are normally energized via AND gate 192 as described hereinbefore. However, the output of AND gate 192 is inhibited by gate 193 if a "too slow" melt has occurred. Gate 193 is actuated by an output from OR gate 152. Thus, an occurrence of an output from OR gate 152 will inhibit gate 193 and prevent any output from being applied from AND gate 192 to LED 202, alarm 204 and counter 205 if a "too slow" melt has occurred.

If the trainee raises the junction temperature too fast, an overheat temperature will be quickly reached since heat is delivered at an uncontrolled rate. This temperature is indicated as 525° F. in FIG. 8, again the temperature being chosen for ease of illustration. Thus, potentiometer 90 will be set at 525° F. Since this setting will be quickly exceeded if the junction is heated too fast, LED 186 and alarm 187 will be energized as described hereinbefore. It should be appreciated there are a number of applications where the desired final temperature is the range of 525°-575° F. and where the overheat temperature would be substantially greater than 575°.

Initial adjustment of the analyzer may be effected by adjustment of potentiometers 78, 90, 92 and 94 to adjust for such factors as the type of solder employed. Further, the thermocouple outputs of FIGS. 3 and 4 may also be employed with the circuitry of FIGS. 7A and 7B.

Figure 9:
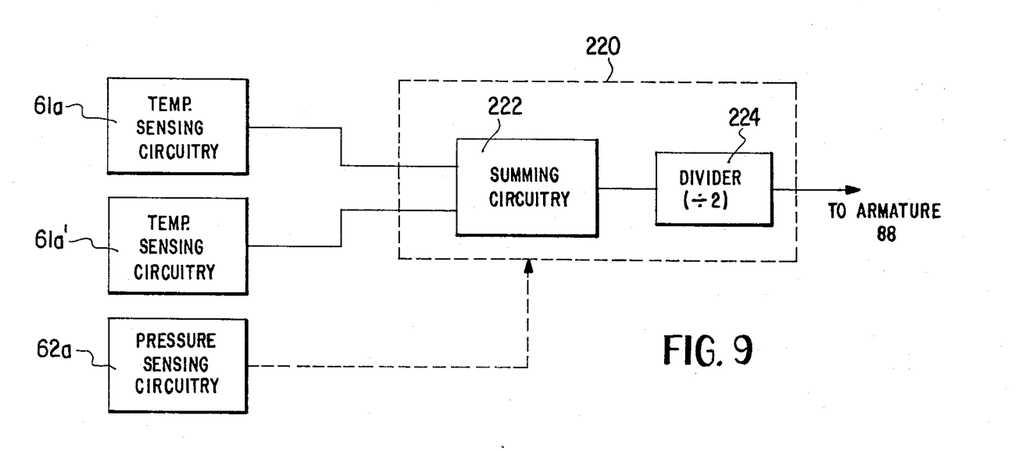
FIG. 9 is a block diagram of illustrative circuitry for processing more than one parameter per terminal.

In FIG. 9, there is disclosed circuitry whereby more than one parameter per terminal may be processed to thereby provide, in some situations, a more accurate measurement of the thermal and/or pressure conditions at a terminal. Thus, in FIG. 9, there is shown temperature sensing circuitry 61a of FIG. 7A. Corresponding pressure sensing circuitry 62a is associated with piezoresistor 62a of FIG. 5. That is, the piezoresistor 62a may take the place of thermister 60a in circuit 61a. Also indicated in dotted lines in FIG. 5 is a second thermister 60a' which might measure the temperature at some point other than the point at which temperature is measured by thermister 60a. This other point might be either internal to the board or might be adjacent lead 10, etc. As shown in FIG. 9, the outputs of circuit 61a and 61a' may be applied to a processing circuit 220. A typical operation to which the output signals from circuits 61a and 61a' might be subjected to is one of taking the average thereof. Accordingly, the signals would be summed in a summing circuit 222 and divided by two in a divider 224. The output of the processor 220 would then be applied to relay armature at 88 of FIG. 7A. The operation of the remainder of the circuits would be exactly the same as described hereinbefore. In addition to being responsive to the thermal information, the processor 220 may also be responsive to stress data provided by circuitry 62a. The types of processing to which processor 220 may subject the input information applied thereto are varied and depend somewhat on the application. Accordingly, it is within the scope of the present invention to employ computer technology including digital microprocessing technology to implement not only the functions of processor 220 (220a) but also those of recognition circuits 210 (210a) and the circuitry associated therewith.

It is within the scope of the present invention to provide a recorder 12 (see FIG. 1) at the output of transducers 20 whereby the electrical signals produced by the respective transducers may be recorded for later processing by analyzer 22. Assuming a standard circuit board of the type illustrated in FIGS. 3 or 5 is employed, a single board may be used by each trainee or other person whose soldering skill is being evaluated such as a repair person who is being re-certified. The boards worked on by a number of people may be recorded on the above-mentioned recorder which may be any type of recording means such as tape, disc or integrated circuit memory. A single analyzer 22 may then be employed to process the recorded evaluation results where the results may be sent from remote locations to a centrally located analyzer.

It is also within the scope of the present invention to provide means other than switch 162 to initiate analysis of a soldering attempt at each terminal. Accordingly, switching means, for example, may be provided which would be actuated upon contact of the soldering iron with board 14. Such switching means may either be electrically or magnetically actuated. Thus, for example, an electrical potential could be applied to the soldering iron tip from a voltage source removed from the tip. The circuit for the voltage source would be completed any time tip 16 contacted land 24a of FIG. 4, for example. Further, individual switches could be associated with each terminal whereby the terminal currently being soldered could be immediately identified. Other such arrngements for initiating analysis of soldering at the terminals and identifying the soldered terminals would also be within the scope of the present invention.

It is also within the further scope of this invention to not only provide indications as to whether the solder has been melted too slow or too fast in soldering operations but to also provide indications as to what temperature and/or pressure (for example) causes different types of damage to a printed circuit board or the like to thereby provide further reinforcement to the trainee. Thus, for example, if the trainee applies too much pressure to the board with his soldering iron, a land or the like may pick up from the board. Further, if too much heat is applied, the conductive patterns may delaminate therefrom, the layers of a multi-circuit board might delaminate, the board itself might measle, etc. Accordingly, appropriate meters such as meter 228 as shown in FIG. 7B may be employed to provide an indication(s) of the temperature and/or pressure at which various types of damage occur where the meters would typically be voltage and/or current meters calibrated to read temperature and/or pressure. Such information provides a trainee with quantitative limits which must not be exceeded to avoid damage to the board or other circuit construction whereby further reinforcement is provided. Instead of providing a continuous indication as shown in FIG. 7B, meter 228 may be actuated, for example, by means (not shown) only when an output occurs from comparator 82 - that is, only when the threshold thereof has been exceeded.

What is claimed is:

1. A practice printed circuit board for use with apparatus for teaching a trainee whether the change of a physical quantity at a terminal of the board corresponds to a desired rate of change of the quantity at the terminal, said practice printed circuit board comprising
   a support;
   a plurality of said terminals comprising holes extending through said support where each hole is coated with an electroconductive material and where the holes are arranged on said support in an ordered array; and
   a plurality of sensing means mounted with respect to said support respectively in the vicinities of said plurality of terminals for producing electrical signals representative of said physical quantities occurring at said terminals
   whereby an operation can be performed with a device at one of said terminals which cause said physical quantity to change so that the sensing means associated with said one terminal produces said electrical signal which is representative of the change in said physical quantity at the terminal.

2. Apparatus circuit construction as in claim 1 where said support is planar.

3. Apparatus as in claim 1 where said sensing means are temperature sensitive.

4. Apparatus as in claim 3 where said sensing means are thermisters.

5. Apparatus as in claim 3 where said sensing means are thermocouples.

6. Apparatus as in claim 1 where said sensing means are pressure sensitive.

7. Apparatus as in claim 1 where said sensing means are piezoresistors.

8. Apparatus as in claim 1 where at least two of said sensing means are disposed at each terminal.

9. Apparatus as in claim 1 including recognition means responsive to said electrical signals for indicating to a trainee whether the change of said physical quanitity is such as to correspond to a desired rate of change of said quantity at the terminal to which the trainee has applied said device to thereby provide positive reinforcement for the trainee.

10. Apparatus as in claim 1 where said terminals are arranged in a rectangular grid, there being M rows and N columns of the terminals where both M and N have a value of at least one.

11. Apparatus as in claim 10 including a plurality of electroconductive means for respectively connecting said plurality of sensing means to at least one side of said support.

12. Apparatus as in claim 11 including a common connector means for receiving said plurality of electroconductive means at said one side of said support.

13. A practice printed circuit board for use with apparatus for teaching a trainee whether the change of a physical quantity at a terminal corresponds to a desired rate of change of the quantity at the terminal, said practice printed circuit board comprising a support;

a plurality of said terminals disposed on said support where said terminals are arranged in a rectangular grid, there being M rows and N columns of the terminals where both M and N have a value of at least one;

a plurality of sensing means respectively disposed in the vicinities of said plurality of terminals for producing electrical signals representative of said physical quantities in said vicinities of the terminals so that an operation can be performed with a device at one of said terminals which causes said physical quantity to change so that the sensing means associated with said one terminal produces said electrical signal which is representative of the change in said physical quantity at the terminal;

a plurality of electroconductive means for respectively connecting said plurality of sensing means to at least one side of said support;

a common connector means for receiving said plurality of electroconductive means at said one side of said support; and indicating means responsive to said electrical signals for indicating to said trainee whether the change of said physical quantity is such as to correspond to said desired rate of change of said quantity at the terminal to which the trainee has applied said device to thereby provide positive reinforcement for the trainee.

14. Apparatus as in claim 13 where said indicating means includes means for determining whether the time required for said quantity to change from an initial value to a predetermined final value is within a predetermined range corresponding to the desired rate of change of said quantity.

15. Apparatus as in claim 13 where said physical quantity is heat.

16. Apparatus as in claim 15 where said indicating means includes means for determining whether the time required for the temperature associated with said heat to rise from an initial value to a predetermined final value is within a predetermined range corresponding to a desired rate of heat supply.

17. Apparatus as in claim 15 where said device is a soldering iron.

18. Apparatus as in claim 17 where said indicating means includes means for determining whether the time required for the temperature associated with said heat to rise from an initial value to a final value necessary to effect a desired electrical connection is within a predetermined range corresponding to solder being melted at the desired rate to form said desired connection.

19. Apparatus as in claim 15 where said device is a desolderer.

20. Apparatus as in claim 13 where said physical quantity is pressure.

21. Apparatus comprising a planar support having an array of terminals disposed thereon;

a plurality of temperature sensing means respectively disposed in the vicinities of said terminals for producing electrical signals representative of the temperature in said vicinities of the terminals;

a plurality of electroconductive means for respectively connecting said plurality of sensing means to at least one side of said planar support;

a common connector means for receiving said plurality of electroconductive means at said one side of said support; and indicating means responsive to said electrical signals; for indicating to a trainee whether the change of said temperature is such as to correspond to a desired rate of change of the temperature at a terminal to which the trainee has applied a heat source to thereby provide positive reinforcement for the trainee, said indicating means being connected to said common connector means.

22. Apparatus as in claim 21 where said heat source is a soldering iron.

23. Apparatus for teaching a trainee the art of soldering an electrical connection at a terminal, said apparatus comprising sensing means for producing an electrical signal representative of the temperature in the vicinity of said terminal to which a soldering iron has been applied by the trainee; and recognition means responsive to said electrical signal for determining whether the time required for said temperature to rise from an initial value to a final value necessary to effect said desired electrical connection is within a predetermined range corresponding to the solder being melted at the correct rate to form said desired connection.

24. Apparatus as in claim 23 including first indicating means for indicating that said desired electrical connection has been effected to thereby provide positive reinforcement to said trainee.

25. Apparatus as in claim 24 including a plurality of said terminals and means for counting the number of said desired electrical connections soldered by said trainee at said plurality of terminals.

26. Apparatus as in claim 25 including means for indicating when said trainee has soldered a predetermined number of said desired electrical connections at said plurality of terminals to thereby provide further positive reinforcement to said trainee.

27. Apparatus as in claim 24 where said recognition means determines whether the time required for said temperature to rise from an initial value to a final value necessary to effect said desired electrical connection is greater than a predetermined maximum corresponding to the solder being melted too slow to form said desired connection, said circuitry including second indicating means for indicating that said solder has been melted too slowly to thereby provide negative reinforcement to said trainee.

28. Apparatus as in claim 27 including means for preventing said first indicating means from being actuated if said second indicating means is actuated.

29. Apparatus as in claim 27 where said recognition means determines whether said temperature in said vicinity of the terminal exceeds a predetermined maximum corresponding to the solder being melted too fast to form said desired electrical connection, said circuitry including third indicating means for indicating that said solder has been melted too fast to thereby provide negative reinforcement to said trainee.

30. Apparatus as in claim 29 including means for preventing said first indicating means from being actuated if said third indicating means is actuated.

31. Apparatus as in claim 23 where said recognition means determines whether the time required for said temperature to rise from an initial value of a final value necessary to effect said desired electrical connection is greater than a predetermined maximum corresponding to the solder being melted too slow to form said desired connection.

32. Apparatus as in claim 31 including indicating means for indicating that said solder has melted too slowly to thereby provide negative reinforcement to said trainee.

33. Apparatus as in claim 31 including means for sensing said initial temperature value, said recognition means including means responsive to the sensed initial temperature value for determining how long said time required for the rise from the initial value to the final value will be.

34. Apparatus as in claim 23 where said recognition means determines whether said temperature in said vicinity of the terminal exceeds a predetermined maximum corresponding to the solder being melted too fast to form said desired electrical connection.

35. Apparatus as in claim 34 including indicating means for indicating that said solder has melted too fast to thereby provide negative reinforcement to said trainee.

36. Apparatus as in claim 23 including a plurality of said terminals and means for counting the number of said desired electrical connections soldered by said trainee at said plurality of terminals.

37. Apparatus as in claim 36 including means for indicating when said trainee has soldered a predetermined number of said desired electrical connections at said plurality of terminals to thereby provide positive reinforcement to said trainee.

38. Apparatus as in claim 23 where said sensing means is a thermister.

39. Apparatus as in claim 23 where said sensing means is a thermocouple.

40. Apparatus as in claim 23 including at least two of said terminals where said trainee may attempt to solder a desired connection at either of said two terminals, said circuitry including at least two of said sensing means respectively producing electrical signals representative of the respective temperatures in the vicinities of the said two terminals and discriminating means for determining which of said two terminals the soldering iron has been applied.

41. Apparatus as in claim 40 where said recognition means is responsive to said two sensing means and said discriminating means for determining the variation of the temperature in the vicinity of said terminal to which said soldering iron has been applied.

42. Apparatus as in claim 41 where said two terminals are located in the proximity of one another, said circuitry including means for ensuring that said recognition means is responsive to only one of said two sensing means, said one sensing means being associated with the terminal to which said soldering iron has been applied whereby heat which diffuses from said one terminal to the other terminal to thereby raise the temperature of the other terminal will not affect the operation of the recognition means.

43. Apparatus as in claim 41 including two of said recognition means respectively responsive to said two sensing means.

44. Apparatus as in claim 23 including at least two of said sensing means disposed at different locations in the vicinity of said terminal, said circuitry including signal processing means responsive to the electrical output signals from said two sensing means for processing the two signals to provide at least one further signal representative of a predetermined condition in the vicinity of said terminal, said recognition means being responsive to said further signal to effect said determination as to whether said desired electrical connection has been formed at the terminal.

45. Apparatus as in claim 44 where said further signal is the average value of said two electrical signals.

46. Apparatus for teaching a trainee to recognize the rate at which heat is supplied by a heat source under the control of the trainee to a predetermined location, said circuitry comprising sensing means for producing an electrical signal representative of the temperature in the vicinity of said location; and recognition means responsive to said electrical signal for determining whether the time required for said temperature to rise from an initial value to a predetermined final value is within a predetermined range corresponding to the desired rate of heat supply.

47. Apparatus as in claim 46 where said heat source is a soldering iron.

48. Apparatus as in claim 46 where said heat source is a desolderer.

49. Apparatus as in claim 46 including first indicating means for indicating that said desired rate of heat supply has been effected to thereby provide positive reinforcement to said trainee.

50. Apparatus as in claim 46 where said recognition means determines whether the time required for said temperature to rise from an initial value to a predetermined final value is greater than a predetermined maximum corresponding to the heat being supplied at too slow a rate.

51. Apparatus as in claim 50 including indicating means for indicating that said heat supply rate is too slow to thereby provide negative reinforcement to said trainee.

52. Apparatus as in claim 46 where said recognition means determines whether said temperature in said vicinity of the location exceeds a predetermined maximum corresponding to the heat being supplied too fast.

53. Apparatus as in claim 52 including indicating means for indicating that said heat supply rate is too fast to thereby provide negative reinforcement to said trainee.

54. Apparatus as in claim 46 including a plurality of said locations and means for counting the number of locations at which heat is supplied at said desired rate.

55. Apparatus as in claim 54 including means for indicating when said trainee has supplied heat at said desired rate at a predetermined number of said locations to thereby provide positive reinforcement to said trainee.

56. Apparatus as in claim 46 where said sensing means is a thermister.

57. Apparatus as in claim 46 where said sensing means is a thermocouple.

58. Apparatus for teaching a trainee to recognize the rate at which a physical quantity changes at a predetermined location on a workpiece, the change of the physical quantity occurring because of a device applied to said location by the trainee, said circuitry comprising sensing means for producing an electrical signal representative of the physical quantity in the vicinity of said location; and recognition means responsive to said electrical signal for determining whether the time required for said quantity to change from an initial value to a predetermined final value is within a predetermined range corresponding to the desired rate of change of said quantity.

59. Apparatus as in claim 58 including first indicating means for indicating that said desired rate of change has been effected to thereby provide positive reinforcement to said trainee.

60. Apparatus as in claim 58 where said recognition means determines whether the time required for said quantity to rise from an initial value to a predetermined final value is greater than a predetermined maximum corresponding to the physical quantity being changed too slow.

61. Apparatus as in claim 60 including indicating means for indicating that said quantity has changed too slow to thereby provide negative reinforcement to said trainee.

62. Apparatus as in claim 58 where said recognition means determines whether said quantity in said vicinity of the location exceeds a predetermined maximum corresponding to the quantity being changed too fast.

63. Apparatus as in claim 62 including indicating means for indicating that said quantity has changed too fast to thereby provide negative reinforcement to said trainee.

64. Apparatus as in claim 58 including a plurality of said locations and means for counting the number of said locations at which said quantity is changed at said desired rate.

65. Apparatus as in claim 64 including means for indicating when said trainee has changed said quantity at said desired rate at a predetermined number of said locations to thereby provide positive reinforcement to said trainee.

66. A method of teaching a trainee to recognize the rate at which a physical quantity changes at a predetermined location on a workpiece, said method comprising the steps of
applying a device to said predetermined location to thereby effect said change in said physical quantity, said device being applied by said trainee;
producing an electrical signal representative of said physical quantity in the vicinity of said predetermined location; and
indicating, in response to said electrical signal, whether the time required for said physical quantity to change from an initial value to a predetermined final value is within a predetermined range corresponding to the desired rate of change of said quantity to thereby provide positive reinforcement to said trainee.

67. A method as in claim 66 where said indicating step includes the step of indicating whether the time required for said quantity to rise from an initial value to a predetermined final value is greater than a predetermined maximum corresponding to the physical quantity being changed too slow to thereby provide negative reinforcement to said trainee.

68. A method as in claim 66 where said indicating step includes the step of indicating whether said quantity in said vicinity of the location exceeds a predetermined maximum corresponding to the quantity being changed too fast to thereby provide negative reinforcement to said trainee.

69. A method as in claim 66 where said workpiece includes a plurality of said locations, said method including the step of counting the number of said locations at which said quantity is changed at said desired rate and indicating when said trainee has changed said quantity at said desired rate at a predetermined number of said locations to thereby provide positive reinforcement to said trainee.

70. A method as in claim 66 where said indicating step includes the step of indicating to said trainee the value of said physical quantity at which damage occurs to said workpiece to thereby provide negative reinforcement to the trainee.

71. A method as in claim 66 where there are a plurality of said workpieces operated on by a plurality of said trainees, said method including the steps of recording the said electrical signals produced for all of said workpieces prior to said indicating step.

72. A method of evaluating an operator including the steps of
applying a device to a predetermined location on a workpiece to effect a change in a physical quantity in the vicinity of said location, said device being applied by said operator to said location;
producing an electrical signal representative of the physical quantity in the vicinity of said location; and
indicating, in response to said electrical signal, whether the time required for said physical quantity to change from an initial value to a predetermined final value is within a predetermined range corresponding to the desired rate of change of said quantity to thereby provide an indication of the skill of said operator in effecting said change in the physical quantity.

73. A method as in claim 72 where there are a plurality of said workpieces worked on by a plurality of said operators, said method including the steps of recording the said electrical signals produced for all of said workpieces prior to said indicating step.

* * * * *